(12) United States Patent
Erdmann et al.

(10) Patent No.: US 7,003,938 B2
(45) Date of Patent: Feb. 28, 2006

(54) FORAGE HARVESTER WITH POSITIONABLE OPERATOR'S CABIN

(75) Inventors: Huber Erdmann, Bielefeld (DE); Markus Deppe, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/818,484

(22) Filed: Apr. 5, 2004

(65) Prior Publication Data

US 2004/0216437 A1    Nov. 4, 2004

(30) Foreign Application Priority Data

Apr. 16, 2003    (DE) .................................. 103 17 816

(51) Int. Cl.
*A01B 73/00*    (2006.01)

(52) U.S. Cl. ......................................... 56/228; 212/223

(58) Field of Classification Search ................ 212/223, 212/246, 248, 254; 414/473, 505; 280/492; 180/89.13; 56/14.4, 14.5, 228
See application file for complete search history.

(56) References Cited

U.S. PATENT DOCUMENTS

| | | | | |
|---|---|---|---|---|
| 3,345,808 A | * | 10/1967 | Van Der Lely | 56/10.2 R |
| 3,352,093 A | * | 11/1967 | Procter | 56/98 |
| 3,825,138 A | * | 7/1974 | Pool | 414/505 |
| 4,409,780 A | * | 10/1983 | Beougher et al. | 56/228 |
| 4,505,396 A | * | 3/1985 | Hedlund et al. | 212/223 |
| 5,845,472 A | * | 12/1998 | Arnold | 56/94 |
| 6,042,326 A | * | 3/2000 | Thomas et al. | 414/502 |
| 6,282,875 B1 | * | 9/2001 | Holtkotte et al. | 56/228 |
| 6,638,159 B1 | * | 10/2003 | Krone et al. | 460/114 |
| 6,775,969 B1 | * | 8/2004 | Wuebbels et al. | 56/208 |

FOREIGN PATENT DOCUMENTS

DE    2 046 552    4/1971

* cited by examiner

*Primary Examiner*—Árd Fábián Kovács
(74) *Attorney, Agent, or Firm*—Michael J. Striker

(57) ABSTRACT

A self-propelled forage harvester has a chassis, an operator's cabin arranged on the chassis, a chopper drum, an ascending lower discharge chute extending from the chopper drum inside the chassis to a level above the chassis, and a working element arrangement, the operator's cabin being movable from a street operating position into at least one chopper operating position and vice versa and the cabin embracing the at least one working element arrangement during movements between the positions.

17 Claims, 4 Drawing Sheets

FORAGE HARVESTER WITH POSITIONABLE OPERATOR'S CABIN

BACKGROUND OF THE INVENTION

The present invention relates to a self-propelled forage harvester with a positionable operator's cabin.

A self-propelled vehicle with a positionable operator's cabin are disclosed for example in the German patent document DE OS 2 046 552. In the inventive embodiment of this vehicle the operator's cabin is arranged rotatably on an arm and is horizontally turnable around a pivot axis, and can be adjusted in at least two positions. The frames of the vehicle are equipped with devices for coupling and for receiving of a working elements. Before the receiving of working element, the operator's cabin is turned from the required mounting space for the working element into a position, in which the operator's cabin is oriented toward the frame and provides an optimal visibility of the operator in traveling direction or on the working element. The disadvantage of such an embodiment is that the operator's cabin is not positioned-changeable around the coupled working element to an opposite position.

Modern forage harvesters travel on the streets with a speed of up to 40 km/h. With the coupled tool, the load on the front axle when compared with the load on the rear axle is very high, the center of gravity of the forage harvester is located very close to the front axle, and due to the arrangement of the drive is placed very far from the ground. With this weight distribution the vehicle during acceleration or braking has an easy inclination to vibrations or swinging. The vehicles which sensitively react to steering impacts and roadway unevenness are difficult to control at high speeds. The non-uniform load distribution is compensated by a ballast which is mounted on the supporting frame in the region of the rear axle. However, this has the disadvantage that the total weight of the forage harvester is increased and simultaneously the usable load is reduced.

SUMMARY OF THE INVENTION

Accordingly, it is an object of the present invention to provide a forage harvester in which the traveling properties and thereby the traveling comfort of the machine are adapted to different operational situations on the street and on the field with and without a coupled front attachment, and thereby these properties are improved.

In keeping with these objects and with others which will become apparent hereinafter, one feature of the present invention resides, briefly stated, in a self-propelled forage harvester, comprising a chassis; an operator's cabin arranged on said chassis; a chopper drum; an ascending lower discharge chute extending from said chopper drum inside said chassis to a level above said chassis; and a working element arrangement, said operator's cabin being movable from a street operating position into at least one chopper operating position and vice versa, and said cabin embracing said at least one working element arrangement during changes between said positions.

When the operator's cabin is movable from at least one street operational position to at least one chopper operating position and vice versa and the cabin during the change from the street operating position to the chopper operating position and vice versa encompasses a working element arrangement it, is guaranteed that the forage harvester can operate in two traveling directions and the operator has a free visibility forward in the corresponding traveling direction.

In accordance with another advantageous embodiment of the present invention, the working element arrangement is a discharge chute.

In accordance with still another feature of the present invention, the change of the position is performed for example by displacing and/or turning of the cabin. The cabin is therefore connected with the chassis in any position.

In order to provide a higher flexibility in the position change, the turning device can be designed with a longitudinally-changeable turning arm, so that the cabin can be displaced with respect to the axle units.

In accordance with a preferable embodiment of the present invention, the turning device has a rotary axis which is arranged outside the lower discharge chute, so that the turning device can be partially turned around the lower discharge chute without contacting the lower discharge chute.

In accordance with the invention two raising elements are provided on the chassis and located at opposite sides of the chassis. Therefore the operator of the operator's cabin can comfortably and reliably reach the chopping operational position and the street operational position.

In accordance with a preferable embodiment of the present invention, the discharge chute is vertically turnable about a horizontal axis. Therefore it can be lowered in the street operation and can be displaced upwardly and further turned during the chopper operation of the chopping product for overloading.

In accordance with a variant of the present invention which has a simple construction and excludes collisions, the operator's cabin and the upper discharge chute can be movable in the same direction to different positions around the lower discharge chute.

For avoiding the danger of collision between the turnable operator's cabin and the longitudinally-changing upper discharge chute, the movements of the operator's cabin and the upper discharge chute are advantageously coupled with one another.

In accordance with the present invention, the movement of the upper discharge chute is limited by an abutment. It is therefore guaranteed that on one hand a flexibly designed overloading region can be covered and on the other hand collisions with further components are avoided.

The operator's cabin in the street operating position is arranged advantageously substantially centrally between the axle units. In this position the vibrations which can act on the operator are reduced.

In accordance with a further embodiment of the present invention, the operator's cabin is arranged near the lower discharge chute. In this position the operator has the best view of the upper discharge chute.

Alternatively, the operator's cabin can be mounted displaceably on a displacement guide and simultaneously can be supported turnably about a vertical axis. In this case it is possible that the cabin can move completely around the lower discharge chute.

In accordance with one embodiment of the displacement guide, the rotary axis of the upper discharge chute and the movement center point of the displacement guide are coaxial. The upper discharge chute and the cabin move advantageously around a common center.

In the above mentioned variant, preferably a joint arm is articulately connected between the displacement guide and the operator's cabin. This provides for a high flexibility in the position change.

For uniform distribution of the load of the chopper, the functional component groups and/or the front attachment in the region of the first axle unit are arranged on the chassis and simultaneously the drive unit is arranged in the region of a further axle unit. This arrangement positively influences the traveling comfort, since it provides an advantageous weight distribution on the forest harvester. The center of gravity of the drive unit is located in the vicinity to the further axle unit so that the forage harvester travels tilting-free in an inclined position.

In accordance with a further embodiment of the present invention, the functional component groups are formed by a drawing-in chute and the lower discharge chute.

In a further embodiment of this design, the lower discharge chute has a plurality of working elements. The working elements in this embodiment can include a chopper drum, a corn cracker and a post-accelerator.

In a further embodiment of this variant, the drawing-in chute has a plurality of compression rolls.

The drive unit of the inventive forage harvester in the present embodiment is composed of a motor, a transmission and a cooler.

In order to move the center of gravity of the front attachment closer to the supporting frame, the front attachment in a transporting position is turnable at least partially in the region of the position of the cabin in the chopper operative position.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
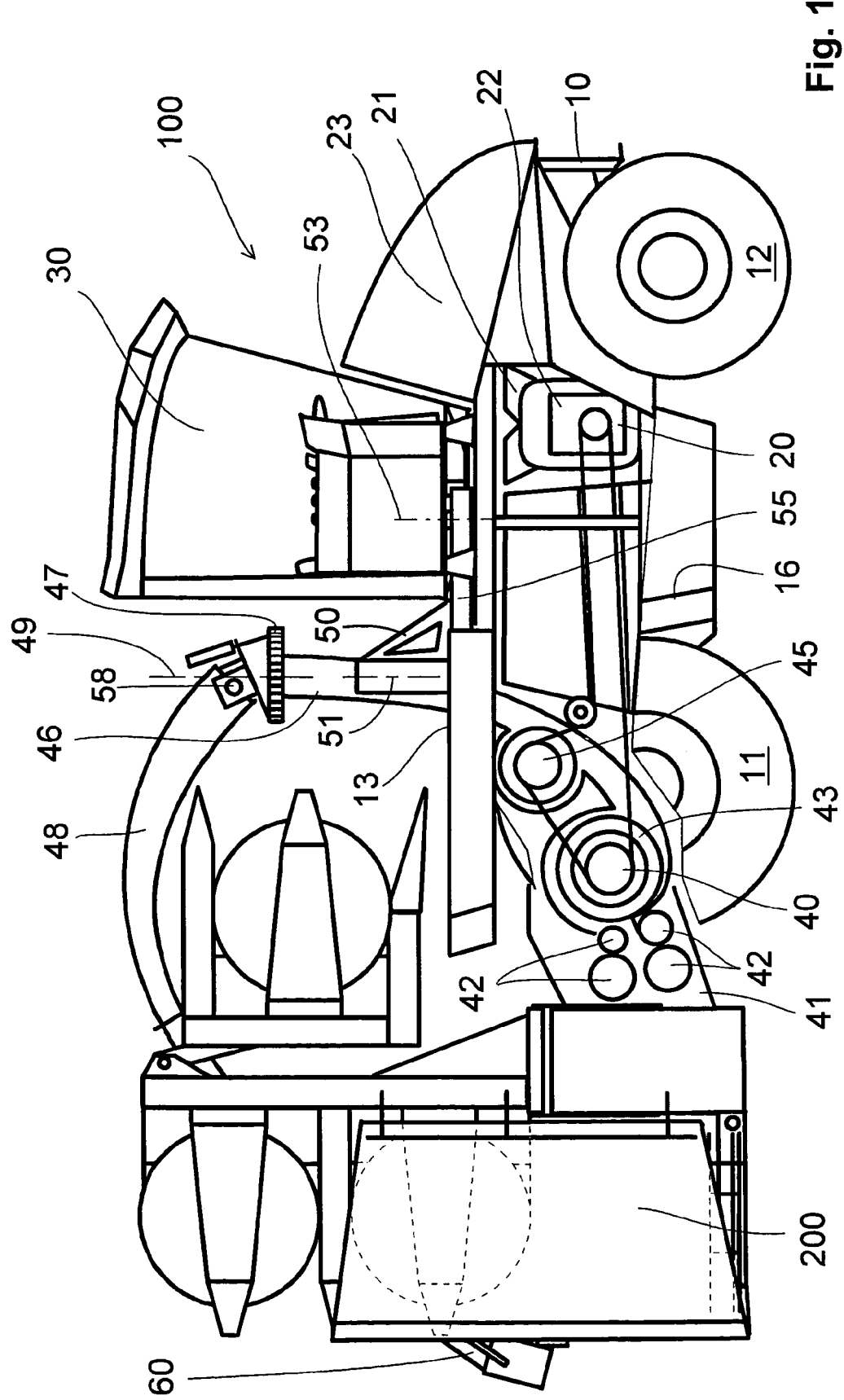
FIG. 1 is a side view of an inventive forage harvester with a partial section through functional component groups.

A forage harvester in FIG. 1 is identified as a whole with reference numeral 100. It has a chassis 10 and an operator's cabin 30 arranged on the chassis. In addition to the cabin 30, also an upper end of an ascending lower discharge chute 46 is arranged on the chassis 10. It extends from a chopper drum 43 inside the chassis 10 to a level above the chassis 10.

In a street operational position 31 the operator's cabin 30 is located between substantially a first axle unit 12 and the lower discharge chute 46, and the view of the operator for controlling is oriented in direction of the first axle 12. The operator's cabin 30 is placed on a turning device 50 which is turnable horizontally about a vertical pivot axis of rotation 51. The turning device 50 is formed as a longitudinally-displaceable straight turning arm 55 with an outer end, on which the operator's cabin 30 is supported turnably around the vertical turning axis of rotation 53. The axis of rotation 51 and the turning device 50 are located forwardly of the lower discharge chute, so that during turning of the operator's cabin over 180° around the lower discharge chute 46, neither the operator's cabin 30 nor the turning device 50 contact the lower discharge chute 46 or exceed a safety distance.

A rotatable upper discharge chute 48 is flanged on the lower discharge chute 46 rotatably around a vertical axis of rotation 49 with a rotary rim 47. The upper discharge chute 48 is additionally adjustable in its height around the horizontal axis 58. The upper discharge chute 48 is adjusted in a street operating position 60 in direction of a further axle unit 11.

The chassis 10 of the forage harvester is supported by the two axle units 11, 12. The first axle unit 12 is provided with smaller wheels than the further axle unit 11. In the vicinity of the first axle unit 12, the chassis carries a drive unit 20. FIG. 1 shows the drive unit 20 in a partial section. It is composed of a motor 21, a transmission 22, and a cooling system 23. The greater part of the load of the drive unit 20 rests on the first axle unit 12, while the center of gravity of the drive unit 20 is located, due to the arrangement of the motor 21 and the transmission 22, substantially at the height of the first axle unit 12.

A functional component group 40 is arranged in the region of the second axle unit 11. It includes a drawing-in chute 41, in which several compression rolls 42 are rotatably supported, and then an approximately vertically extending lower discharge chute 46 arranged after the drawing-in chute 41 and accommodating a chopper drum 43, a subsequent not shown corn cracker, and a post-accelerator 45. In accordance with the present invention, further not shown elements can be also associated with the lower discharge chute 46.

A front attachment 200 which is known in the art and not shown in detail is associated with the drawing-in chute 41. The greater part of the load of the functional component group 40 and the front attachment 200 rests on the second axle unit 11.

The front attachment 200 is folded in a transportation position and is arranged partially over the supporting frame 10.

Figure 2:
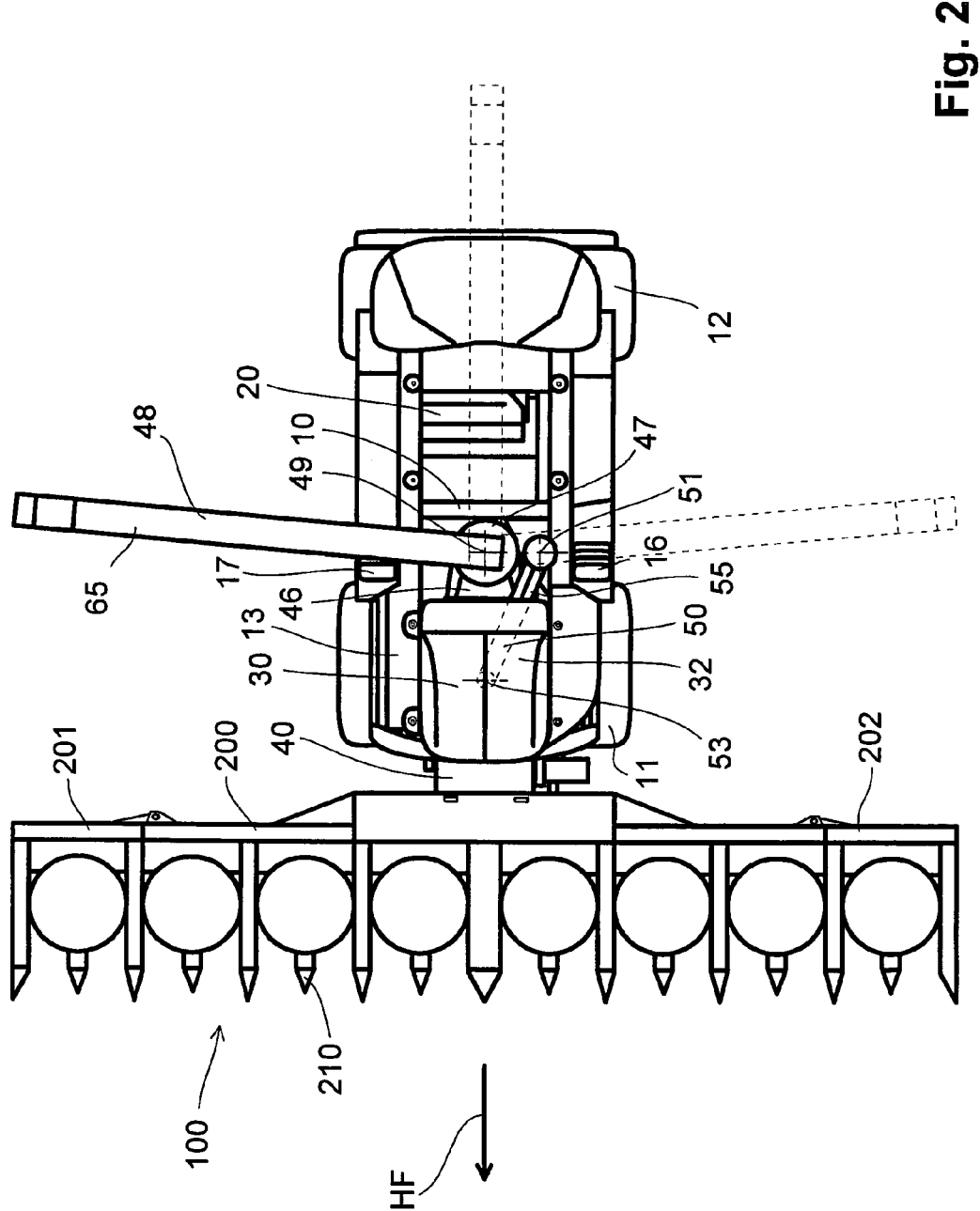
FIG. 2 is a schematic plan view of the inventive forage harvester with turned-out front attachment in a chopper operating position.

FIG. 2 shows a schematic plan view of the inventive forage harvester 100 with a series-independent attachment 200. The operator's cabin is located in a chopper operating position 32 over the axle unit 11 and the view of the operator during controlling is oriented toward the front attachment 200. The upper discharge chute 43 is adjusted in a chopper operating position 65 transversely to the longitudinal axis of the forage harvester 100, from which it is turnable during chopping around the axis of rotation 49 opposite to the clockwise direction over 180°. The turning device 50 and the axis of rotation 51 are arranged near the lower discharge chute 46.

During changing of the position of the operator's cabin 30 and the upper discharge chute 48 from the street operating position 31, 60 to the chopper operating position 32, 65 and during changing back, the operator's cabin 30 and the upper discharge chute 48 move in the same direction around the lower discharge chute 46. Abutments prevent collision of the operator's cabin 30 and the upper discharge chute 48. The movements of the operator's cabin 30 and the upper discharge chute 48 are coupled with one another during the position change. The movements are monitored for example electronically by sensors, and their determined data are transmitted to an evaluation unit. The evaluation unit evaluates the data and supports the movements for the upper discharge chute 48 when the operator's cabin 30 for example by software.

The operator's cabin 30 can be reached over a raising element 16 in the vicinity of the axle unit 11, at the right side of the forage harvester 100.

The unfolded front attachment 200 which is mounted at the end side on the chassis 10 in front of the drawing-in chute 41, is located in a working position 210. The front attachment 200 extends outwardly beyond the width of the forage harvester 100, and in this position it is arranged under the supporting plane 13. The center of gravity of the unfolded attachment 200 located parallel to the axle unit 11 is located in front of the axle unit 11 outside of the chassis 10.

The corn which stands on the field is cut by the front attachment 200 and transported to the drawing-in chute 41, the corn is processed by the functional component group 40 and the produced product leaves the functional component group 40 through the lower discharge chute 46. The upper discharge chute 48 which is directly connected with the lower discharge chute 46 transports the product for overloading in a desired direction.

The forage harvester 100 shown in FIG. 2 travels during harvesting preferably in a chopper traveling direction HF on the field. It is to be understood that the forage harvester 100 can also travel in an opposite direction backwards for ranging.

Figure 3:
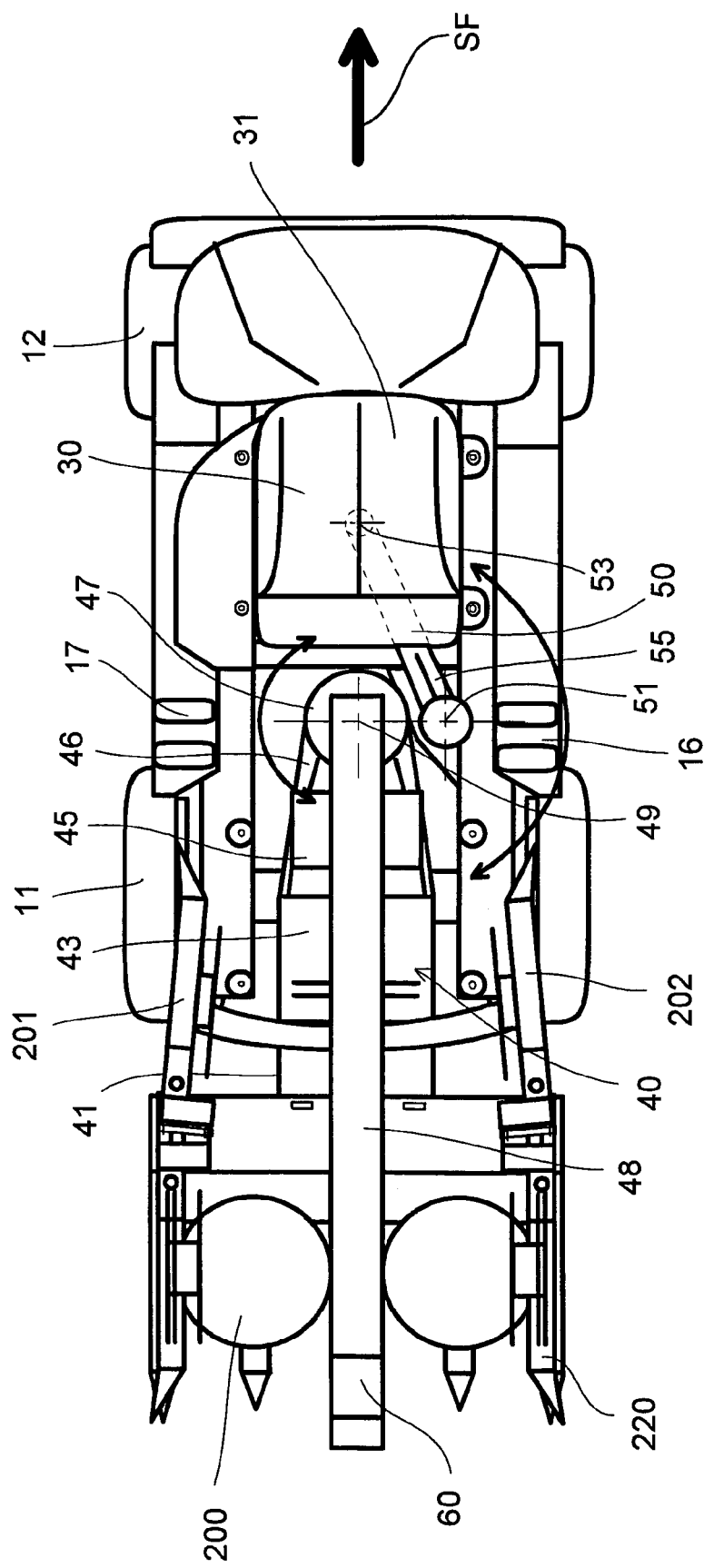
FIG. 3 is a schematic plan view of the inventive forage harvester with a turned-in front attachment in a street operating position.

FIG. 3 shows a schematic plan view of the inventive forest harvester 100 with series-independent front attachment 200 in an upwardly folded transporting position 220. The upwardly folded front attachment 200 is smaller than the greatest width of the forage harvester 100.

The operator's cabin in the shown street operating position is reachable through a second right-side raising element 17 which is located between the axle units 11 and 12 on the supporting frame 10.

The forage harvester 100 shown in FIG. 3 is preferably travels in a street traveling direction SF on the street. It is to be understood that the forest harvester 100 can also travel in an opposite direction backwards for ranging.

The change from the street operating positions 31, 60 to the chopper operating positions 32, 65 is performed in the forage harvester 100 shown in FIGS. 2 and 3 in clockwise direction, while the reverse change of the positions is performed opposite to the clockwise direction.

Figure 4:
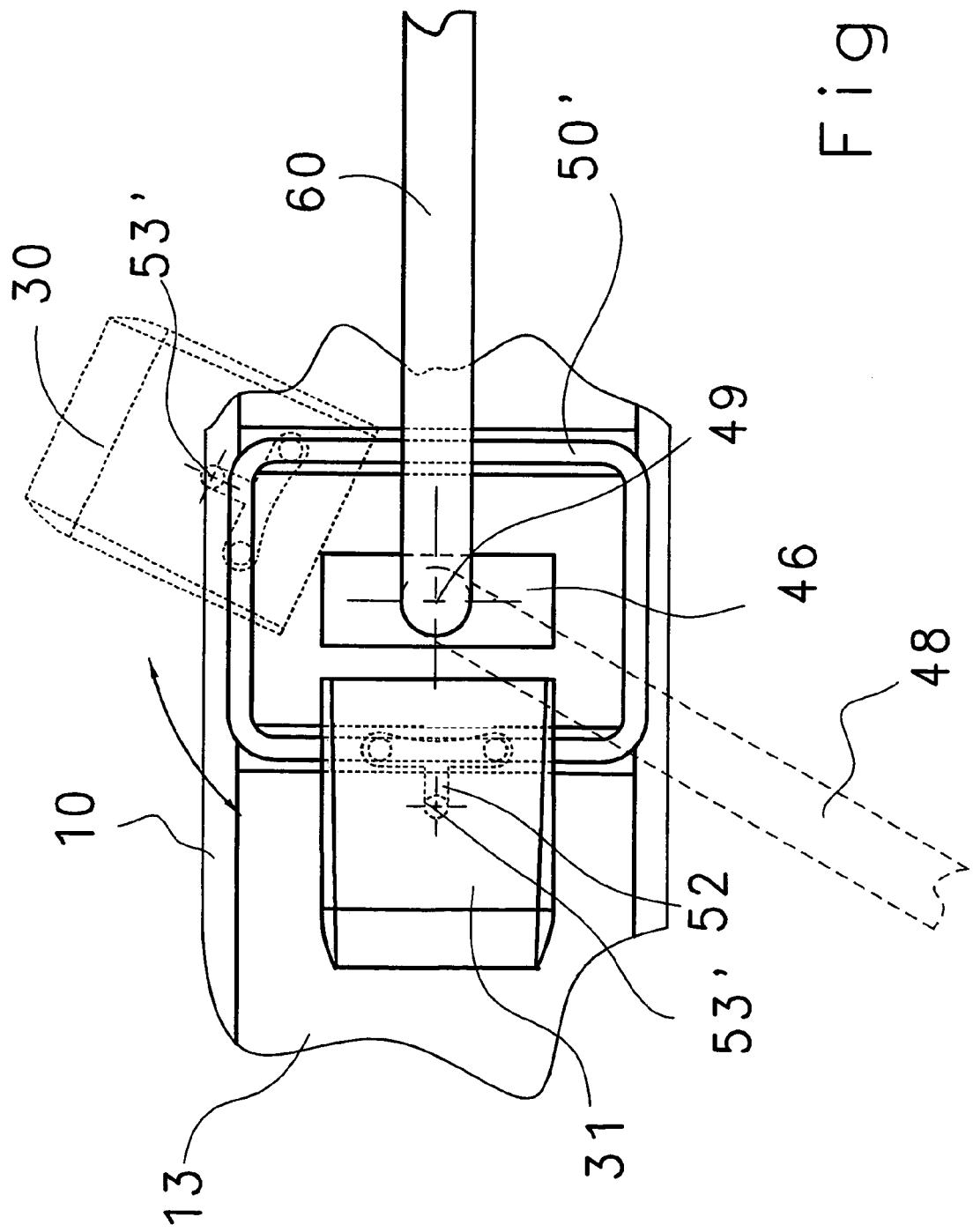
FIG. 4 is a detailed view of a second embodiment of an inventive turning device in a plan view.

FIG. 4 shows a second embodiment of the turning device. The displacement guide 50' is arranged around the lower discharge chute 46 on the chassis plane 13. The operator's cabin 30 is arranged on the displacement guide 50' through a straight joint arm 52. The joint arm 52 is arranged on an inner end displaceably in the displacement guide 50'. The operator's cabin 30 is supported rotatably about a vertical axis of rotation 53' on the outer end of the joint arm 52. The cabin 50 is turnable around a movement center point 51' which is coaxial with the axle rotation 49 of the upper discharge chute. This embodiment makes possible a complete rotation of the operator's cabin 30 around the lower discharge chute 46, which is partially rotational and partially translatory.

During operation on a street in the street traveling direction SF the distribution of the loads and the reverse of the traveling direction in particular during braking from higher speeds are especially useful. During significant deceleration from higher speed, the weight of the axle unit 11, the functional component group 40 and the front attachment 200 prevents lifting of the axle unit 11 of the forage harvester 100 from the street.

It is also within the spirit of the present invention that, in deviation from the shown embodiment in FIGS. 1–3, the raised elements 16 and 17 can be arranged mirror-symmetrically on the support frame 10 and the movement directions of the cabins 30 and the upper discharge chute 48 can be reversed.

It will be understood that each of the elements described above, or two or more together, may also find a useful application in other types of constructions differing from the types described above.

While the invention has been illustrated and described as embodied in a forage harvester with a positionable operator's cabin, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A self-propelled forage harvester, comprising: a chassis; an operator's cabin arranged on said chassis; a chopper drum; an ascending lower discharge chute extending from said chopper drum inside said chassis to a level above said chassis; and a working element arrangement, said operator's cabin being movable from a street operating position into at least one chopper operating position and vice versa, in which street operating and chopper operating positions the harvester drives in opposite directions, and said cabin embracing said at least one working element arrangement during the movements of said operator's cabin from the street operating position into the at least one chopper operating position and vice versa, so that the forage harvester can operate in two traveling directions and the operator has a free visibility forward in each corresponding traveling direction.

2. A self-propelling forage harvester as defined in claim 1, wherein said working element arrangement is the lower discharge chute.

3. A self-propelling forage harvester as defined in claim 1, wherein said cabin is formed so that the movement between said positions is a movement selected from the group consisting of a displacement, a turning, and both, of said cabin.

4. A self-propelling forage harvester as defined in claim 1; and further comprising a turning device provided with a longitudinally changeable turning arm.

5. A self-propelling forage harvester as defined in claim 4, wherein said turning device has an axis of rotation which is located outside of said lower discharge chute.

6. A self-propelling forage harvester as defined in claim 1, and further comprising raising means arranged on said chassis so that said operator's cabin is reachable through said raising means in said chopper operating position and in said street operating position.

7. A self-propelling forage harvester as defined in claim 2, and further comprising an upper discharge chute which is flanged on said lower discharge chute and is vertically turnable about a horizontal axis.

8. A self-propelling forage harvester as defined in claim 7, wherein said upper discharge chute is movable from its chopper operating position to its street operating position.

9. A self-propelling forage harvester as defined in claim 7, wherein said operator's cabin and said upper discharge chute are positionable in a same direction around said lower discharge chute.

10. A self-propelling forage harvester as defined in claim 7, wherein said operator's cabin and said upper discharge chute are arranged so that movements of said operator's cabin and said upper discharge chute are coupled with one another.

11. A self-propelling forage harvester as defined in claim 7, and further comprising abutment means which limit a movement of said upper discharge chute in a direction selected from the group consisting of a horizontal direction, a vertical direction, and both.

12. A self-propelling forage harvester as defined in claim 1, and further comprising two axle units, said operator's cabin in said street operating position being arranged substantially centrally between said axle units.

13. A self-propelling forage harvester as defined in claim 2, wherein said operator's cabin is arranged near said lower discharge chute.

14. A self-propelling forage harvester as defined in claim 1, and further comprising a displacement guide, said cabin being mounted displaceably on said displacement guide and is turnable about a vertical axis of rotation.

15. A self-propelling forage harvester as defined in claim 7, wherein an axis of rotation of said upper discharge chute and a movement center point of said displacement guide are coaxial.

16. A self-propelling forage harvester as defined in claim 14, and further comprising a joint arm articulately connected between said displacement guide and said operator's cabin.

17. A self-propelled forage harvester, comprising: a chassis; an operator's cabin arranged on said chassis; a chopper drum; an ascending lower discharge chute extending from said chopper drum inside said chassis to a level above said chassis; and a working element arrangement, said operator's cabin being movable from a street operating position into at least one chopper operating position and vice versa, in which street operating and chopper operating positions the harvester drives in opposite directions, and said cabin embracing said at least one working element arrangement during the movements of said operator's cabin from the street operating position into the at least one chopper operating position and vice versa, so that the forage harvester can operate in two traveling directions and the operator has a free visibility forward in each corresponding traveling direction, wherein in the chopper operating position and in the street operating positior the forage harvester drives in opposite directions.

* * * * *